Oct. 18, 1960
B. CAMETTI ET AL
2,956,841
BEARING AND MOUNTING THEREFOR
Filed Jan. 30, 1957
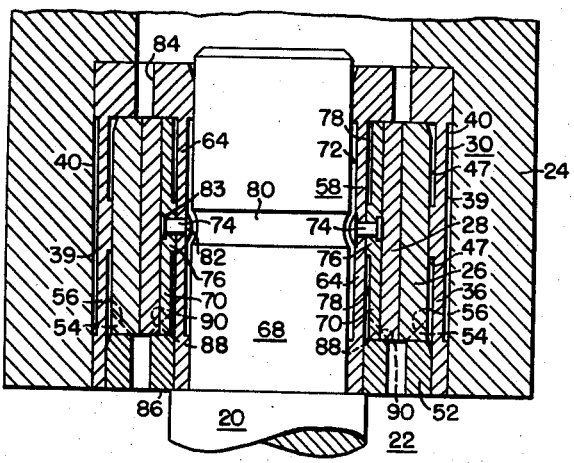
Fig. 1.
Fig. 2.
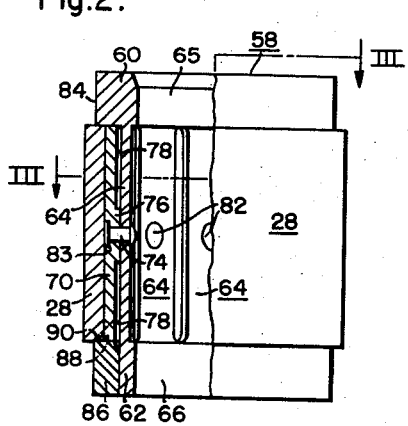
Fig. 4.
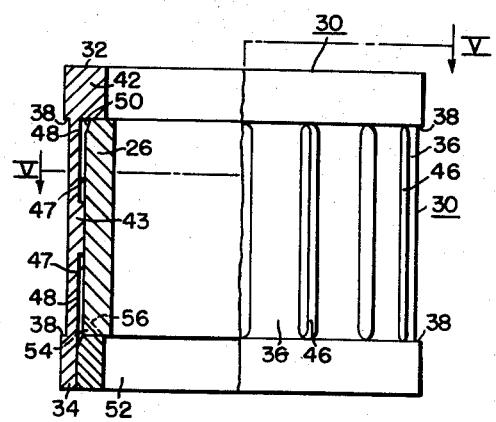
Fig. 3.
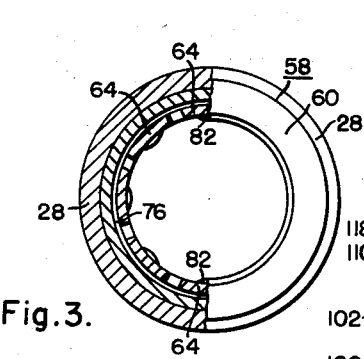
Fig. 6.
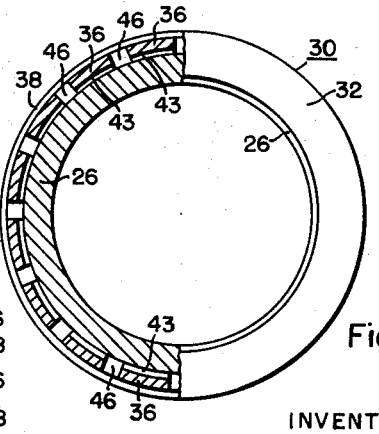
Fig. 5.
WITNESSES
INVENTORS
Benjamin Cametti &
Oliver P. Steele III
BY
ATTORNEY

United States Patent Office 2,956,841
Patented Oct. 18, 1960

2,956,841

BEARING AND MOUNTING THEREFOR

Benjamin Cametti, Forest Hills, and Oliver P. Steele III, Franklin Township, Westmoreland County, Pa., assignors to Westinghouse Electric Corporation, East Pittsburgh, Pa., a corporation of Pennsylvania Filed Jan. 30, 1957, Ser. No. 637,181

16 Claims. (Cl. 308—26)

The present invention relates to a sleeve-type bearing and more particularly to a thermally expansible bearing of the character described.

The bearing forming the subject matter of this invention is adapted particularly for use with a liquid metal "canned" motor-pump combination, such as that described in connection with the regenerative cold trap disclosed in a copending application of O. P. Steele III and H. F. Kongabel, filed January 30, 1957, Serial No. 637,210, and assigned to the assignee of the present application. It will be obvious, however, that the bearing can be adapted to other applications and other apparatus utilizing sleeve-type bearings.

In the case of liquid metal canned motor-pumps it is particularly necessary to provide means associated with the bearing to permit expansion thereof when the bearing material is mounted in a holder having a differing coefficient of expansion. For an example, a tungsten carbide bearing member having a coefficient of expansion of $2.8 \times 10^{-6}$ in./in./° F. is mounted frequently in a stainless steel holder having a coefficient of expansion of $9.5 \times 10^{-6}$ in./in./° F. A considerable expansional differential therefore results between the bearing material and the material of the holder when the bearing disclosed herein is furnished with those motor-pumps which are operated at the elevated temperatures usually encountered in liquid metal systems. As stated in the aforesaid application, such temperatures may be as high as 500° C.

It is further necessary that the mount or holder for the bearing, when used in applications subject to pounding or shock forces, permit a certain amount of elastic yielding in order to prevent damage to the parts associated with the bearing assembly. This elastic yielding likewise is often necessary to prevent rupture of the comparatively thin lubricating film existing between the bearing surfaces when such shock forces are encountered. This factor assumes increasing importance in the case of water or liquid metal lubricated pumps, and motor-pumps where the resultant lubricating films are of minimal thinness. Therefore, the aforesaid elastic yielding associated with the bearing holder is necessary in order to achieve higher operating pressures and temperatures of the device utilizing bearings of the character described.

Due to the high operating temperatures to which the bearing and associated machinery are subjected, it is necessary to make a maximum of the area of the bearing element available for contact with an appropriate coolant fluid circulated through the apparatus utilizing the bearing. Furthermore, because of the required maintenance of a specified distance between various operating parts of apparatus utilizing such bearings, for an example, a liquid-metal motor-pump wherein a precise gap must be maintained between the rotor and stator thereof; an expansible bearing in many applications must be provided with means for automatically centering the component parts of the bearing relative to the motor shaft.

Heretofore it has been the practice to furnish such bearings in the form of concentric sleeves in which the bearing members are dovetailed into appropriate grooves provided in the bearing holders. The oblique surfaces of the bearings and the bearing holders are arranged to intersect, when projected, the concentric or middle point of the bearing members. Thus, when materials of differing coefficients of expansion are utilized for the bearings in the bearing holders, expansional movement between the bearings and the bearing holders will take place along the oblique surfaces thereof. Thus, the longitudinal expansion of the bearings and bearing holders must balance the radial expansion thereof so that the movement will take place in the direction as described. In this arrangement very accurate machining of the engaging parts has been required in order to so condition the aforesaid oblique surfaces for the differential expansions of the bearings and bearing holders. Similarly a very careful alignment has been required relative to the bearing members and their holders in order to accurately position the shaft relative to the associated parts of the apparatus. In this and other arrangements, no adequate means has been provided for the self-alignment of the bearing members and the holders therefor, and consequently of the shaft relative to the associated components of the apparatus. Additionally, the replacement and repair of prior bearings of the character described frequently has been time-consuming due to the difficulty in removal thereof from the apparatus in which the bearing was used. Moreover, the performance of such bearings has been often unpredictable because of the tendency thereof, in many cases, to slide or to move relative to their holders.

Accordingly, an object of the invention is to provide a more efficient sleeve-type bearing assembly and holder associated therewith.

A further object of the invention is to provide means for facilitating removal of a bearing of the character described from the apparatus with which the bearing is utilized.

Another object of the invention is to provide means for adequately cooling a sleeve-type bearing assembly.

A still further object of the invention is to provide means for permitting relative thermal expansion of the components of a bearing assembly in order that differing structural materials can be utilized efficiently therefor.

Yet another object of the invention is to furnish a bearing of the character described with novel means for self-aligning the component parts thereof.

Another object of the invention is to provide a sleeve-type bearing assembly having means incorporated therein for preventing sliding and galling in the bearing assembly.

Still other objects of the invention are to provide eliminating means for machining and avoiding the necessity of accurately prealigning the component parts of a bearing assembly, for facilitating replacement and repair of the component parts thereof, for protecting the bearing assembly from damage resulting from pounding or other application of shock forces, and for preventing the rupture of the lubricating film existing between the bearing surfaces when such shocks are encountered.

A further object of the invention is to provide means associated with a sleeve-type bearing to enable operation of such bearings at elevated pressures and temperatures.

These and other objects, features and advantages of the invention will be explained in detail during the forthcoming description of exemplary forms of the invention, the description being taken in conjunction with the accompanying drawing, wherein:

Figure 1 is a substantially central, longitudinal sectional view of one form of bearing assembly constructed according to the principles of this invention;

Fig. 2 is an elevational view, partly in section, of the inner sleeve bearing member and holder therefor illustrated in Fig. 1;

Fig. 3 is a top plan view, partly in section of the bearing member shown in Fig. 2, as indicated by reference lines III—III thereof;

Fig. 4 is an elevational view, partly sectioned, of the outer bearing sleeve and holder therefor shown in Fig. 1;

Fig. 5 is a top plan view, partly in section, of the device shown in Fig. 4, as indicated by reference lines V—V thereof; and Fig. 6 is a partial sectional view similar to Fig. 1, of another form of the bearing assembly constructed in accordance with this invention.

According to the invention, a bearing assembly of the type utilizing concentric opposing bearing sleeves is provided with means for permitting differential expansion between the bearing sleeves and their respective holders. Additionally, centering means are provided in association with one or more of the bearing sleeves for centering the sleeve relative to its respective holder, and consequently relative to the operating parts of the apparatus in which the bearing is being utilized. A retaining member for each of the bearing sleeves is arranged for attachment to the respective holder and is further adapted to prevent sliding or other movement of the bearing sleeve relative to its holder.

Referring now more particularly to the drawing, the exemplary form of the invention illustrated in Figs. 1 to 5 thereof is arranged for mounting on a drive shaft 20 which is suitably spaced by the bearing assembly indicated generally at 22 from the walls of a suitable bearing housing or cartridge 24. The bearing assembly 22 includes an outer bearing sleeve 26 and an inner bearing sleeve 28. The outer bearing sleeve is better shown in Figs. 4 and 5 and is mounted within a holder 30 having means associated therewith for permitting elastic yielding of the holder 30 as the latter expands relative to the bearing sleeve 26. In this example of the invention, the bearing sleeve 26 and the holder 30 are constructed of respective materials such that the holder 30 will expand more rapidly with increasing temperature than will the material of the bearing sleeve 26, such as the materials hereinbefore indicated.

One arrangement for permitting the differential expansion as aforesaid includes constructing the holder 30 in the form of upper and lower ring members or end rings 32 and 34, respectively, joined together by a plurality of integrally formed leaf springs 36 rigidly attached thereto. Each of the end rings 32 and 34 is provided with an outwardly extending annular portion 38, which is arranged to provide a space 39 between each of the leaf springs 36 and the walls of a journal 40 formed in the bearing housing 24 when the holder 30 is inserted into the journal 40 as shown in Fig. 1. Obviously there can be utilized as a greater number, or a lesser number, that is to say, at least three such leaf springs 36, as compared to the number of springs shown in the drawing. The total number of leaf springs is dependent upon the strength of the material from which they are fabricated and upon the centering forces desired to be exerted upon the associated bearing sleeve. These centering forces are discussed subsequently in greater detail. The upper ring 32 is further provided with an inwardly extending overhanging portion 42 arranged to engage the upward end of the bearing sleeve 26 in order to position the latter relative to the holder 30. Each of the leaf springs 36 is furnished with a centrally disposed protuberance 43 which is arranged to contact the outer periphery of the bearing sleeve 26 and thus to center the sleeve 26 relative to the holder 30 and the associated bearing housing 24. The protuberances 43 also serve to space the remainder of each of the leaf springs 36 from the outer periphery of the bearing sleeve 26 in order that the extremities of the leaf springs 36 and the bearing sleeve 26 can move relative to one another as necessitated by the differeing coefficients of expansion thereof.

In assembling the bearing sleeve 26 in the holder 30, the sleeve 26 is desirably inserted into the holder 30, which is heated to a higher temperature than that encountered during operation of the associated apparatus in order that the protuberances 43 of the holder 30 will tightly engage the bearing sleeve 26 during operation of the apparatus. Thus when the holder 30 cools, the leaf springs 36 will be bowed outwardly due to the contraction in the holder 30, particularly that of the rings 32 and 34. It will be appreciated that the space 47 existing between the leaf springs 36 and the bearing sleeve 26 will be of sufficient extent that the thinned portions 48 of the leaf springs 36 will not contact the extremities of the bearing sleeve 26 during the temperature range encountered in operation of the apparatus. The bearing sleeve 26 is provided with a chamfer 50 adjacent the upper end thereof to facilitate insertion of the bearing sleeve 26 into the holder 30.

The bearing sleeve 26 is secured longitudinally of the holder 30 by means of retaining ring 52 shrunk-fitted or otherwise secured to the bottom ring member 34 of the holder 30. The retaining ring 52 is provided with at least one upwardly extending tab 54, with two being utilized in this example of the invention, for insertion into similarly disposed recesses 56 formed in the lower end of the bearing sleeve 26. With this arrangement turning or sliding of the bearing sleeve 26 relative to the holder 30 is positively prevented.

Since the same force is exerted by each of the protuberances 43 and leaf springs 36 at equally spaced points around the periphery of the bearing sleeve 26, the bearing sleeve 26 will therefore always be centered relative to the holder 30 and the housing or cartridge 24. The resiliency of the leaf springs 36 not only permits relative expansion between the bearing sleeve 26 and the holder 30, but additionally provides means for absorbing any pounding or shock forces that may be imparted to the bearing assembly during operation thereof. Similarly, any accidental misalignment of the bearing assembly such as may be caused by the aforesaid pounding or shock forces will be quickly and effectively remedied by the plurality of centering forces exerted collectively upon the bearing sleeve 26 by the leaf springs 36.

As better shown in Figs. 2 and 3 of the drawing, the inner bearing sleeve 28 is supported on the outer periphery of an inner bearing holder 58, which similarly includes upper and lower ring members 60 and 62, respectively, joined by a plurality of integral leaf springs 64. The leaf springs 64 are spacedly mounted relative to one another in order to facilitate the relative movement thereof. Each of the upper and lower ring members 60 and 62 are provided with individual inwardly extending annular portions 65 and 66. Thus when the inner sleeve holder 60 is mounted on journal portion 68 of the shaft 20, the leaf springs 64 are maintained in positions spacedly removed from the surface of the journal portion 68. Thus the leaf springs 64 are actuated in the same manner as described in connection with the leaf springs 36 of the holder 30 under the impetus of differing expansional rates or of the application of pounding or shock forces to the shaft 20. However, the holder 58, the bearing sleeve 28 and the associated centering sleeve 70 presently to be described, can be assembled at room temperature so that the leaf springs 64 will bow inwardly when the bearing assembly 22 is raised to its customary operating temperatures. It will be appreciated that space 72 enclosed between the leaf springs 64 and the surface of the shaft journal 68 is of sufficient extent to accommodate the inward bowing of the leaf springs 64 without their touching the surface of the journal 68, at the highest operating temperatures of the bearing assembly.

The bearing sleeve 28 is shrunk-fitted or otherwise secured to the aforementioned centering sleeve 70 which in turn is secured, in this arrangement of the invention, to each of the leaf springs 64 by means of rivets 74. The centering sleeve 70 is provided with an annular projection 76 extending inwardly and centrally thereof and adapted to engage each of the leaf springs 64. Alternatively, the annular projection 76 can be omitted from the centering sleeve, and each of the leaf springs 64 can be furnished with centrally disposed outwardly facing protuberances (not shown) similar to protuberances 100, presently to be described in connection with Fig. 6 of the drawing, and arranged to contact the inner surface of the centering sleeve. A suitable space 78 is thereby formed between the centering sleeve 70 and each of the leaf springs 64 in order that the extremities of the centering sleeve 70 will not contact the leaf spring 64 when the latter are bowed inwardly by the relative thermal expansion between the components of the bearing assembly. A circumferential groove 80 is provided on the journal 68 to accommodate heads 82 of the rivets 74 during the inward movement of leaf springs 64.

Alternatively a singly-headed pin (not shown) that is, a rivet with inner head 82 omitted, may be utilized in place of each rivet 74, since there can be no outward movement of the inner bearing sleeve 28 and the centering sleeve 70 relative to the central portions of the leaf spring 64. In this arrangement the groove 80 can be omitted and the aforesaid pins will be secured in place by the heads thereof sandwiched between the recess 83 and the inner surface of the bearing sleeve 28.

The upper ring member 60 is provided with an outwardly extending overhanging portion 84 which is adapted to engage the upper ends, respectively, of the centering sleeve 70 and the inner bearing sleeve 28 in order to position the same longitudinally of the bearing holder 58. A retaining ring 86 is shrunk-fitted or otherwise secured to the outer periphery of the lower ring member 62 and is arranged to engage the lower extremities of the inner bearing sleeve 28 and centering sleeve 70. The retaining ring 86 is formed with a number of upwardly extending tabs 88 inserted into respective recesses 90 provided in the lower ends of the inner bearing sleeve 28 and centering sleeve 70. As described heretofore in connection with the retaining ring 52 of the bearing holder 30, the retaining ring 86 thus operates to prevent positively any turning movement of the bearing sleeve 28 relative to the holder 58.

The purpose of the centering sleeve 70 is to ensure that the bearing sleeve 28 will be centered precisely relative to the holder 58 after the accidental imposition of pounding or shock forces during utilization of the bearing assembly 22. This is accomplished by rigidly securing the inner bearing sleeve 28 to the central portion of each of the leaf springs 64 by means of the centering sleeve 70 as described heretofore. Therefore, any slight relative movement between the central portion of leaf springs 64 and the bearing sleeve 28 is prevented. Such relative movement otherwise would create frictional forces between at least some of the leaf springs 64 and the inner periphery of the inner bearing sleeve 28 which would tend to prevent the exact recentering thereof with respect to the holder 58, and accordingly would tend to hold the shaft 20 slightly out of alignment with the bearing sleeve 28. This slight misalignment of the shaft 20 with the associated bearing sleeve 28 would produce wobble and vibration of the apparatus at high rotative speeds of the shaft 20.

Although a centering sleeve similar to the centering sleeve 70 may be provided in conjunction with the outer sleeve bearing holder 30, the same is omitted in this embodiment of the invention for the reason that any very slight misalignment of the outer bearing sleeve 26 with the holder 30 and the associated cartridge 24 obviously would not change the center of rotation of the shaft 20.

In less stringent applications of the bearing assembly, the centering sleeve 70 may be omitted entirely and the inner bearing sleeve 28 can be supported in a bearing holder 92 as illustrated in Fig. 6 of the accompanying drawing. The bearing holder 92, which is similar in construction to the holders described heretofore, includes upper and lower ring members 94 and 96, respectively, joined by means of a plurality of integral leaf springs 98. Each of the leaf springs 98 is provided with an outwardly extending protuberance 100. The protuberances 100 are disposed centrally of the leaf springs 98 and are adapted to engage and to center the inner bearing sleeve 28 relative to the holder 92. The protuberances likewise permit inward bowing of the leaf springs 98 without causing their engagement with the upper and lower extremities of the bearing sleeve 28. A space 102 is provided between each of the leaf springs 98 and the inner bearing sleeve 28 in order to accommodate the inward bowing of the leaf springs. In furtherance of the same purpose, inwardly extending annular portions 104 and 106 are formed on the upper and lower ring members 94 and 96, respectively, to space the leaf springs 98 from the surface of the shaft journal 68 (Fig. 1). The inner bearing sleeve 28 is positioned longitudinally of the holder 92 and retained thereon by means of overhanging portion 110 and a retaining ring 112, respectively. As described heretofore in connection with Figs. 1–3 of the drawing, a plurality of upwardly extending tabs 114 are formed on the retaining ring 112 and are inserted into the recesses 90 provided at the lower extremity of the bearing sleeve 28 to prevent thereby relative turning movement of the bearing sleeve 28 in the holder 92. Between adjacent leaf springs 98 elongated slots 116 are formed to permit individual movement of the leaf springs and to admit coolant fluid, if desired, to the inner surface of the bearing sleeve 28 (Fig. 6) via flow passages 118 and 120 which can be, respectively, provided in the upper ring member 94 and the retaining ring 112. The outer bearing holder 30 and the inner bearing holder 58 (Fig. 1) can likewise be provided with coolant flow passages (not shown), where desired.

From the foregoing it will be apparent that novel and efficient forms of a sleeve-type bearing arrangement have been disclosed. Although the invention has been described in connection with liquid metal motor-pumps and the like, it will be apparent that the invention can be adapted to any suitable apparatus using bearings of the character described. Therefore, numerous modifications of the aforedescribed exemplary arrangements will occur to those skilled in the art without departing from the scope of the appended claims. Furthermore, it is to be understood that certain features of the invention can be employed without a corresponding use of other features.

We claim as our invention:

1. In a bearing assembly, the combination comprising a holder including a pair of axially spaced ring members and a plurality of circumferentially spaced leaf springs secured to said ring members at respective extremities of said leaf springs; a protuberance formed on each of said leaf springs, said protuberances being disposed centrally thereof; a bearing sleeve mounted on said holder in engagement with said protuberances, a circumferential surface of one of said ring members extending beyond an adjacent lateral surface of each of said leaf springs to engage an end of said bearing sleeve to position said sleeve on said holder, and a retaining ring secured on a circumferential surface of the other of said ring members and engaging the other end of said bearing sleeve.

2. In a bearing assembly, the combination comprising a holder including a pair of axially spaced ring members; a plurality of leaf springs secured to said ring members at respective extremities of said leaf springs; a protuberance formed on each of said leaf springs, said protuberances being disposed centrally thereof; a bearing sleeve mounted on said holder in engagement with said protuberances, said bearing sleeve engaging and being positioned at one end by one of said ring members; and a retaining ring secured on the other of said ring members and engaging the other end of said bearing sleeve, said retaining ring having at least one tab formed thereon and inserted into a complementary recess formed adjacent an extremity of said bearing sleeve.

3. In a bearing assembly, a pair of axially spaced ring members, a plurality of leaf spring members secured at ends thereof to said ring members, respectively, a centering sleeve having an annular projection engaging said leaf springs and spacing said springs from said sleeve, means securing said projection to each of said leaf springs at the points of said engagement, a bearing sleeve located adjacent said centering sleeve and means located on said assembly engaging said bearing sleeve to prevent axial movement thereof relative to said leaf spring members.

4. In a bearing assembly, a pair of axially spaced ring members; a plurality of leaf spring members secured at ends thereof to said ring members, respectively; a centering sleeve having an annular projection engaging said leaf springs; means securing said centering sleeve to each of said leaf springs at the points of said engagement; a bearing sleeve secured to said centering sleeve, said bearing sleeve and said centering sleeve engaging at corresponding extremities thereof, one of said ring members; and a retaining ring secured to the other of said ring members and engaging the other extremities of said bearing sleeve and said centering sleeve.

5. In a bearing assembly, a pair of axially spaced ring members; a plurality of leaf spring members secured at ends thereof to said ring members, respectively; a centering sleeve having an annular projection engaging said leaf springs; means securing said centering sleeve to each of said leaf springs at the points of said engagement; a bearing sleeve secured to said centering sleeve, said bearing sleeve and said centering sleeve engaging at respective extremities thereof, one of said ring members; and a retaining ring secured to the other of said ring members and engaging the other respective extremities of said bearing sleeve and said centering sleeve, said retaining ring having at least one tab formed thereon inserted into a complementary recess formed in at least one of said other extremities of said bearing sleeve and said centering sleeve.

6. A bearing assembly comprising, outer and inner bearing holders, said holders each including a pair of axially spaced ring members and a plurality of leaf springs joined at ends thereof to said ring members, respectively; a plurality of inwardly extending protuberances formed centrally on said outer holder leaf springs respectively; a plurality of outwardly extending protuberances formed centrally on said inner holder leaf springs respectively; an outer bearing sleeve mounted on said outer holder in a position of engagement with said inwardly extending protuberances; an inner bearing sleeve mounted on said inner holder and secured individually to said outwardly extending protuberances; and means for mounting said inner holder within said outer holder in a position of engagement between said outer and said inner bearing sleeves.

7. A bearing assembly comprising, an outer bearing holder and an inner bearing holder, each of said bearing holders comprising a pair of axially spaced ring members and a plurality of leaf springs joined at ends thereof to said ring members, respectively; an inwardly extending protuberance formed centrally on each of said outer holder leaf springs; a centering sleeve surrounding said inner holder leaf springs and having a centrally disposed inwardly extending annular projection engaging each of said inner holder spring members; means securing said centering sleeve to each of said inner holder leaf springs individually at points of said engagement; an outer bearing sleeve mounted on said outer holder and engaging said inwardly extending protuberances; an inner bearing sleeve secured to said centering sleeve; and means for mounting said inner holder within said outer holder in a position of engagement between said inner bearing sleeve with said outer bearing sleeve.

8. In a bearing assembly, the combination comprising a holder including a pair of axially spaced ring members and a plurality of leaf springs secured at the ends thereof to said ring members, respectively; a bearing sleeve; an annulus secured to each of said leaf springs for mounting said bearing sleeve on said holder; and means interposed between said annulus and said leaf springs for spacing said annulus from each of said springs.

9. In a bearing assembly, the combination comprising a holder including a pair of ring members and a plurality of circumferentially spaced leaf springs secured at ends thereof to said ring members, respectively; a bearing sleeve mounted on said holder, said bearing sleeve engaging and being positioned at one end by one of said ring members; a retaining ring secured to the other of said ring members and engaging the other end of said bearing sleeve; and means interposed between said sleeve and said leaf springs for spacing said sleeve from each of said springs and for securing said sleeve to each of said leaf springs individually.

10. In a sleeve bearing holder, a pair of axially spaced ring members, a plurality of circumferentially disposed leaf spring members secured at ends thereof to said ring members, respectively, said leaf spring members being spaced from the adjacent ones thereof at a distance sufficient to prevent engagement thereof when said spring members are radially displaced, a centering sleeve, means interposed between said sleeve and said spring members for mounting said centering sleeve in spaced relationship relative to said spring members, means securing said centering sleeve to each of said spring members, and means disposed on said holder to engage a bearing sleeve to prevent axial displacement thereof.

11. A bearing assembly comprising outer and inner bearing holders, said holders each including a pair of axially spaced ring members and a plurality of leaf springs joined at the ends thereof to said ring members, respectively; an outer bearing sleeve mounted on said outer holder; an inner bearing sleeve mounted on said inner holder; means interposed between said outer holder leaf springs and said outer bearing sleeve for spacing said outer bearing sleeve from each of said outer holder leaf springs; means interposed between said inner holder leaf springs and said inner bearing sleeve for spacing said inner bearing sleeve from each of said inner holder leaf springs, said last-mentioned means in addition securing said inner bearing sleeve to each of said inner holder leaf springs individually; and means for mounting said inner holder within said outer holder in a position of engagement between said outer and said inner bearing sleeves.

12. A bearing assembly comprising outer and inner bearing holders, said holders each including a pair of axially displaced ring members and a plurality of leaf springs joined at ends thereof to said ring members, respectively; an outer bearing sleeve mounted on said outer holder; a centering sleeve mounted on said inner holder; an inner bearing sleeve secured to said centering sleeve; means interposed between said outer bearing sleeve and said outer holder leaf springs for spacing said outer bearing sleeve from each of said outer holder leaf springs; means interposed between said centering sleeve and said inner holder leaf springs for spacing said centering sleeve from each of said inner holder leaf springs; means for securing said centering sleeve to each of said inner holder leaf springs individually; and means for mounting said inner holder within said outer holder in a position of engagement of said outer and said inner bearing sleeves.

13. In a bearing holder adapted to hold a bearing sleeve formed from a material having different expansion properties from said bearing holder, the combination comprising axially spaced ring members and a plurality of circumferentially spaced leaf springs rigidly secured to and joining said ring members, said leaf springs being spaced at a distance to prevent interaction thereof when said holder is subjected to varying radial forces, said leaf springs each having a central protuberance formed thereon for engaging said bearing sleeve, a circumferential surface of at least one of said ring members extending beyond the adjacent lateral surface of each of said leaf springs to engage an end of said bearing sleeve to position said sleeve on said holder and means disposed to engage said bearing sleeve to prevent axial movement thereof relative to said leaf springs.

14. In a bearing holder, the combination comprising a pair of axially spaced ring members, a plurality of circumferentially spaced leaf springs joined at extremities thereof to said ring members, respectively, a centering sleeve mounted on said holder and having an annular projection engaging each of said leaf springs and spacing said springs from said sleeve, and means for securing said centering sleeve to each of said leaf springs at points respectively of said engagement to ensure the return of said centering sleeve to its normal position after it has been radially displaced.

15. In a bearing holder for use in a rotating machine and adapted to hold a bearing sleeve formed from a material having different expansion properties from said bearing holder, the combination comprising axially spaced ring members and a plurality of circumferentially spaced leaf springs rigidly secured to and joining said ring members, said leaf springs being spaced at a distance to prevent interaction thereof when said holder is subjected to varying radial forces, said leaf springs each having a central protuberance formed thereon for engaging said bearing sleeve, a circumferential surface of at least one of said ring members at one side of said holder extending beyond the adjacent lateral surface of each of said leaf springs to engage an end of said bearing sleeve to position said sleeve on said holder, and both circumferential surfaces of said ring members at the other side of said holder extending beyond the adjacent lateral surface of each of said leaf springs to space said leaf springs from adjacent components of said machine.

16. In combination, a bearing holder and a bearing sleeve, said sleeve being formed from a material having different expansion properties from said bearing holder, said holder including axially spaced ring members and a plurality of circumferentially spaced leaf springs rigidly secured to and joining said ring members, said leaf springs being spaced at a distance to prevent interaction thereof when said holder is subjected to varying radial forces, said leaf springs each having a central protuberance formed thereon for engaging said bearing sleeve and spacing said sleeve from said springs, and means on said holder engaging said sleeve to prevent axial movement of said sleeve relative to said springs.

References Cited in the file of this patent

UNITED STATES PATENTS

| | | |
|---|---|---|
| 1,370,599 | Leon | Mar. 8, 1921 |
| 2,641,516 | Bakane | June 9, 1953 |
| 2,647,808 | Spurgeon | Aug. 4, 1953 |

FOREIGN PATENTS

| | | |
|---|---|---|
| 205,655 | Great Britain | Sept. 19, 1922 |